United States Patent [19]

Krohn

[11] Patent Number: 5,345,351

[45] Date of Patent: Sep. 6, 1994

[54] PIVOTING DEVICE FOR A COVER OF THE CASSETTE HOLDER OF A MAGNETIC-TAPE CASSETTE APPARATUS

[75] Inventor: Martin Krohn, Wetzlar, Fed. Rep. of Germany

[73] Assignee: U.S. Philips Corporation, New York, N.Y.

[21] Appl. No.: 940,115

[22] Filed: Sep. 3, 1992

[30] Foreign Application Priority Data

Sep. 9, 1991 [DE] Fed. Rep. of Germany ....... 4129945

[51] Int. Cl.⁵ ........................................... G11B 15/675
[52] U.S. Cl. .................................................. 360/96.5
[58] Field of Search ............................. 360/96.5, 96.6

[56] References Cited

U.S. PATENT DOCUMENTS 3,800,328  3/1974  Harlan et al. ..................... 360/137
4,795,109  1/1989  Chung et al. ...................... 360/96.5

FOREIGN PATENT DOCUMENTS 60-119661  6/1985  Japan ................................. 360/96.5
63-214955  9/1988  Japan ................................. 360/96.5
1-122057   5/1989  Japan ................................. 360/96.5
1-243263   9/1989  Japan ................................. 360/96.5
2-58755    2/1990  Japan ................................. 360/96.6

Primary Examiner—John H. Wolff
Assistant Examiner—Craig A. Renner
Attorney, Agent, or Firm—William L. Botjer

[57] ABSTRACT

The invention relates to a pivoting device for a cover (7) by means of which an insertion opening (3) of a cassette holder of a magnetic-tape-cassette apparatus can be closed, which cover can be pivoted into an open position by a magnetic-tape cassette (5) during insertion thereof, in order to expose the insertion opening (3), after which it returns into its closed position, and which cover is again pivoted into the open position by the magnetic-tape cassette (5) during the outward movement thereof until the removal of the magnetic-tape cassette (5) from the cassette holder, the strip-shaped cover (7) being secured to a pivoting spindle (9) by one of its long edges (7b), which cassette holder can be lowered into a play position with the magnetic-tape cassette inserted. A sensing lever (11) is pivotable about a sensing-lever spindle (13) parallel to the pivoting spindle (9), carries a sensing element (17) to sense the upper main wall (21a) of the magnetic-tape cassette (5), and between the sensing-lever spindle (13) and the sensing element (17) carries a toothed rack meshing with a toothed wheel (25) carried by the pivoting spindle (9).

3 Claims, 3 Drawing Sheets

PIVOTING DEVICE FOR A COVER OF THE CASSETTE HOLDER OF A MAGNETIC-TAPE CASSETTE APPARATUS

BACKGROUND OF THE INVENTION

The invention relates to a pivoting device for a cover by means of which an insertion opening of a cassette holder of a magnetic-tape-cassette apparatus can be closed, which cover can be pivoted into an open position by a magnetic-tape cassette during insertion thereof, in order to expose the insertion opening, after which it returns into its closed position, and which cover is again pivoted into the open position by the magnetic-tape cassette during the outward movement thereof until the removal of the magnetic-tape cassette from the cassette holder, the strip-shaped cover being secured to a pivoting spindle by one of its long edges, which cassette holder can be lowered into a play position with the magnetic-tape cassette inserted.

Such a pivoting device for a cover is known from EP 156 443 B1. The cover is strip-shaped and has substantially the same dimensions as the insertion opening of the cassette holder of a magnetic-tape-cassette deck; it serves for closing the insertion opening in order to avoid the undesirable visual impression presented by an open hole and to inhibit undesirable access. Moreover, such a cover protects the interior of the deck against the ingress of dust and other contaminants. The cover is arranged on supporting arms which project substantially perpendicularly from the cover into the apparatus. The free ends of the supporting arms have lugs engaging with pins of the deck frame. The pivotal axis thus defined extends parallel to the upper edge of the cover. The supporting arms and the pivots constitute a pivoting device which is actuated by guide pins of the cassette holder. The cover is opened to insert a cassette. At the end of the insertion movement as the cassette holder is lowered the guide pins, which act upon elastic tongues, pull the cover into a closed position. When the magnetic-tape cassette is ejected the guide pins lift and pivot the cover into the open position.

U.S. Pat. No. 3,800,328 describes a pivoting device for a cover of the insertion opening of the cassette holder of a magnetic-tape-cassette apparatus in which the strip-shaped cover is secured to a pivoting spindle at one of its long edges. This pivoting spindle has two parts and the two interengaging parts are each spring-loaded to swing the cover before the insertion opening first from one side and then from the other side. During insertion of a cassette the front wall of the cassette pushes the cover aside, thereby tensioning a spring which enables the spring-assisted return into the initial position. Once the cassette has been inserted fully the cassette liberates the cover and said spring swings the cover back into the initial position. When the cassette is slid out of the apparatus it also swings the cover aside, this time in the opposite direction, and the second spring is tensioned to ensure that after removal of the cassette the cover returns into its initial position in which it covers the insertion opening.

SUMMARY OF THE INVENTION

It is an object of the invention to provide a pivoting device for a cover, whose movement is controlled by the magnetic-tape cassette and which is of simple construction.

According to the invention this object is achieved by a sensing lever which is pivotable about a sensing-lever spindle parallel to the pivoting spindle, which can sense the upper main wall of the magnetic-tape cassette with a sensing element which it carries, which between the sensing-lever spindle and the sensing element carries a toothed rack which is in mesh with a toothed wheel carried by the pivoting spindle.

Such a pivoting device, by means of which the cover is moved by the magnetic-tape cassette when it is inserted and ejected, does not require pre-tensioned springs to move the cover into its closed position when the cassette has been inserted and removed. When a cassette is inserted it moves the cover aside and the cover thus lifts the sensing lever with its sensing element. When the magnetic-tape cassette has been inserted and is lowered into its play position it is followed by the sensing lever with its sensing element being pivoted anti-clockwise; the sensing lever then returns the cover back into its closed position via the toothed rack and the toothed wheel. When the magnetic-tape cassette is lifted out of the play position in order to be ejected it pivots the sensing lever clockwise via the sensing element; the cover is then pivoted into its open position via the toothed rack and the toothed wheel. When the magnetic-tape cassette moves out of the holder the sensing dement follows the upper main wall of the cassette. When the sensing element no longer detects a main wall the sensing lever swings down in the anti-clockwise direction. The cover is forced to pivot also anti-clockwise and closes the insertion opening.

The forces required for moving the cover are produced either by the insertion movement of the cassette or by the force of gravity, which ensures that the liberated sensing lever falls with its free end down. This construction is simple and can be realised without much expense.

In a further embodiment of the invention the cover is spring-loaded in the closing direction. The spring load assists the lowering movement of the cover and prevents its from rattling in the case of vibrations.

In a further embodiment of the invention the toothed rack is curved as a an arc of circle, the are forming part of a circle which is centered about the sensing-lever spindle. The cooperation between the toothed wheel and the arcuate toothed rack enables a construction of small depth to be obtained for the pivoting device.

BRIEF DESCRIPTION OF THE DRAWINGS

The invention will now be described in more detail with reference to the drawings. In the drawings.

DETAILED DESCRIPTION OF THE PREFERRED EMBODIMENT

Figure 1:
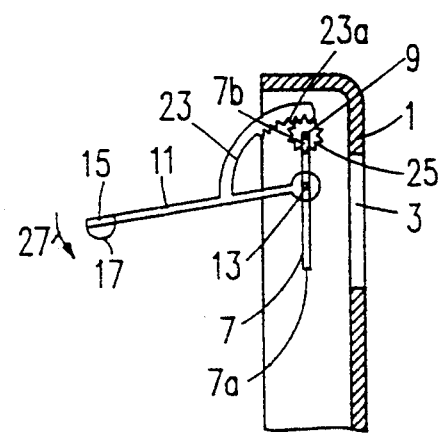
Figs. 1 to 7 show a pivoting device for a cover for the insertion opening of the cassette holder of a magnetic-tape-cassette apparatus in different operating positions, FIG. 8 diagrammatically shows the pivoting device and the cover together with a part of a magnetic-tape cassette.

FIG. 1 is a sectional view of a part 1 of a front wall of the deck of a magnetic-tape-cassette apparatus. This front wall has a insertion opening 3 for magnetic-tape cassettes 5. A strip-shaped cover 7 has a lower long edge 7a and an upper long edge 7b. The upper long edge 7a is secured to a pivoting spindle 9 supported in the part 1. The cover 7 is capable of visually and mechanically closing the insertion opening 3.

A sensing lever 11 is pivotable about a sensing-lever spindle 13 parallel to the pivoting spindle 9. This sensing-lever spindle 13, which is also supported in the part 1, extends parallel to and beneath the spindle 9 and intersects the central axis of the cover 7 in its closed position.

Figure 8:
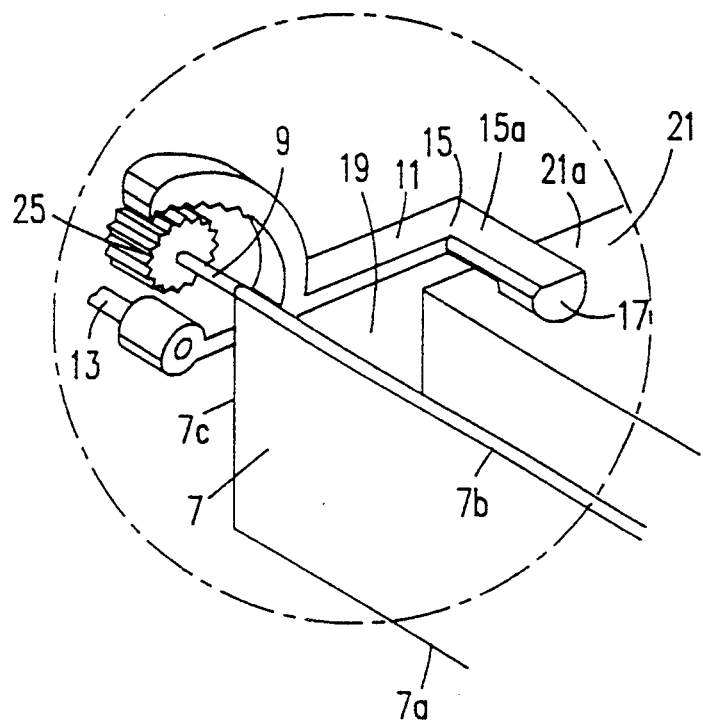

At its free end 15 the sensing lever 11 carries a sensing element 17. As is shown in FIG. 8, this sensing element 17 is arranged on an arm 15a of the sensing lever 11. As is also shown in FIG. 8, the sensing lever 11 is situated adjacent a short edge 7c of the cover 7 outside the holder interior 19. By means of the arm 15a the sensing element 17 thus extends into the path of movement of the magnetic-tape cassette 5 and can cooperate with the upper main wall 21 of this cassette. Between the sensing-lever spindle 13 and the arm 15a a toothed rack 23 is provided on the sensing lever 11. The toothed rack 23 has teeth 23a and has an arcuate curvature forming part of a circle which is centered about the sensing-lever spindle 13. The teeth 23a of the toothed rack mesh with a toothed wheel 25 secured on the pivoting spindle 9.

If no magnetic-tape cassette 5 has been inserted into the holder, not shown, of the deck of the magnetic-tape-cassette apparatus the sensing element 17 is pivoted about the sensing-lever spindle 13 in an anti-clockwise direction as indicated by an arrow 27 in FIG. 1. The toothed rack 23 has rotated the toothed wheel 25 and thereby moved the cover 7 into its closed position shown in FIG. 1. The pivotal movement is produced by the force of gravity acting on the free end 15 of the sensing lever 11. This position is illustrated in FIG. 1.

Figure 2:
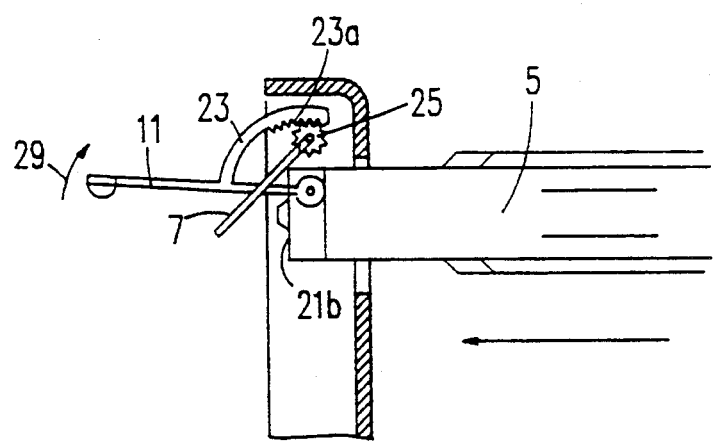

FIG. 2 shows how the cover 7 is opened when a magnetic-tape cassette 5 is inserted. When it is inserted the magnetic-tape cassette 5 abuts against the cover 7 with its short side 21b, which faces forward during insertion, and pivots this cover clockwise. The toothed wheel 25 drives the toothed rack 23 via its teeth 23a and the sensing lever 11 is thus aim pivoted clockwise. The movement of the sensing lever 11 is indicated by an arrow 29.

Figure 3:
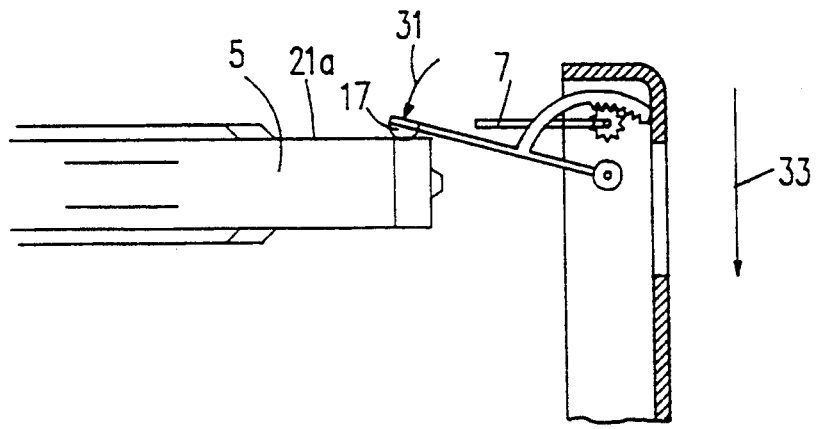

FIG. 3 shows the magnetic-tape cassette 5 at the end of its insertion path. Under the influence of the force of gravity, which is indicated by an arrow 31, the sensing element 17 lies on the upper main wall 21a of the magnetic-tape cassette 5. The cover 7 is in a horizontal position. After complete insertion the magnetic-tape cassette 5 is lowered into its play position. This lowering is indicated by an arrow 33 in FIG. 3.

Figure 4:
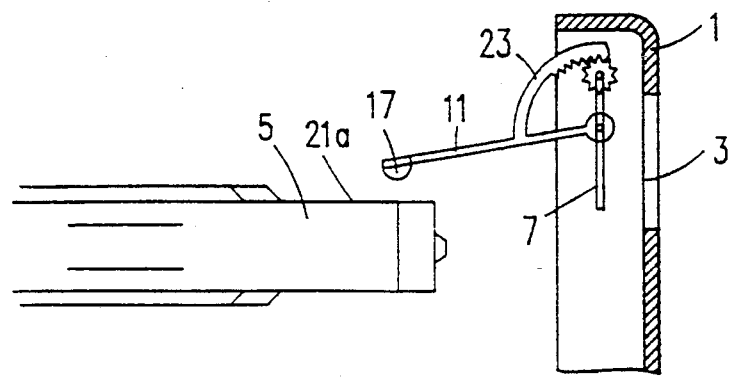
Figure 5:
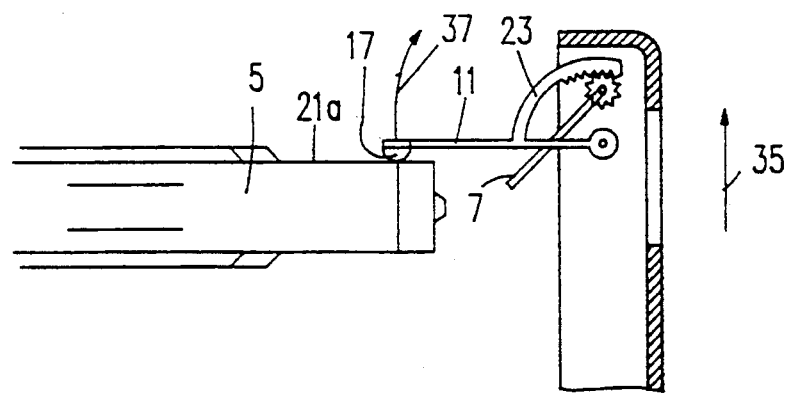

FIG. 4 shows the magnetic-tape cassette 5 in its lowered play position. Under the influence of the force of gravity acting in the direction indicated by the arrow 13 the sensing element 17 is lowered so far, while the sensing lever 11 is pivoted anti-clockwise, that the toothed rack 23 can swing the cover 7 into its closed position. This swinging back of the cover 7 into its closed position is illustrated in FIG. 5, which also shows that the magnetic-tape cassette 5 has been lowered to a level where it can no longer be followed by the sensing element 17.

Figure 6:
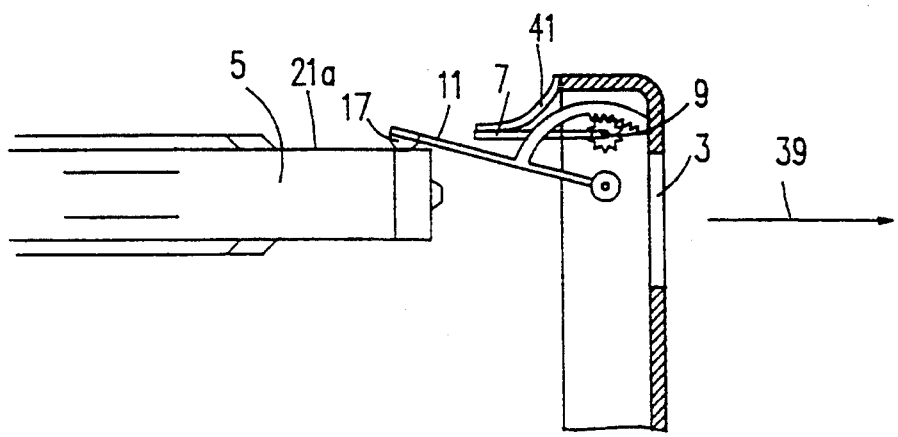

If the magnetic-tape cassette is to be ejected from the holder it is first lifted in the direction indicated by an arrow 35. During lifting the upper main wall 21a pivots the sensing lever 11 clockwise via the sensing element 17 in the direction indicated by the arrow 37. As a result of this the toothed rack 23 moves the cover 7 clockwise from the closed position into a horizontal position. This horizontal position is shown in FIG. 6. The magnetic-tape cassette 5 can now be slid out of the holder of the magnetic-tape-cassette apparatus in the direction indicated by an arrow 39.

Figure 7:
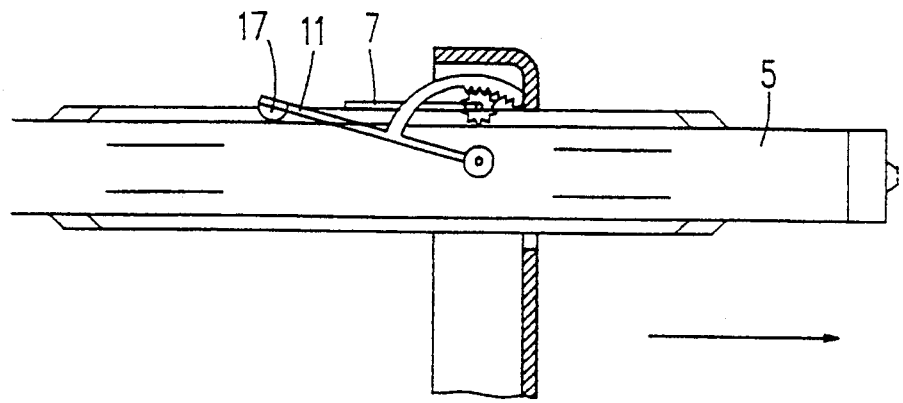

FIG. 7 illustrates the outward movement with the cover 7 in a horizontal position. When the short side 21b of the magnetic-tape cassette 5 moves away from the sensing element 17 this element fails again and pivots the sensing lever 11 anti-clockwise. The cover 7 is also pivoted anti-clockwise until it has resumed its closed position shown in FIG. 1.

A spring 41, shown diagrammatically in FIG. 6, can aid the closing movement of the cover 7. The spring also prevents the cover 7 from ratting in the case of vibration of the apparatus.

I claim:

1. A pivoting device used to close a cover of an insertion opening of a cassette holder of a magnetic-tape-cassette apparatus, said cover being pivoted into an open position by a magnetic-tape cassette during insertion thereof, in order to expose the insertion opening, after which said cover returns into its closed position, said cover also being pivoted into the open position by the magnetic-tape cassette during the outward movement thereof until the removal of the magnetic-tape cassette from the cassette holder, the cover being securely to a pivoting spindle by one of its long edges, said cassette holder being lowered into a play position with the magnetic-tape cassette inserted, wherein the improvement comprises:

a sensing lever pivotable about a sensing-lever spindle whose axis is parallel to the axis of the pivoting spindle, said sensing lever being positioned within the interior of the cassette apparatus, said sensing lever being arranged to sense the upper main wall of the magnetic-tape cassette with a sensing element which said sensing lever carries, said sensing lever carrying a toothed rack between the sensing-layer spindle and the sensing element such that said toothed rack is in mesh with a toothed wheel carried by the pivoting spindle, said toothed rack and said toothed wheel transferring motion from said cover to said sensing element when said cover is in contact with said cassette and from said sensing element to said cover when said sensing element is in contact with said cassette.

2. A pivoting device as claimed in claim 1, wherein the cover is spring-loaded in the closing direction.

3. A pivoting device as claimed in claim 1, wherein the toothed rack is curved as an arc of a circle, the arc forming part of a circle which is centered about the sensing-lever spindle.

* * * * *